US012718039B2

(12) United States Patent
Ling et al.

(10) Patent No.: US 12,718,039 B2

(45) Date of Patent: Aug. 25, 2026

(54) SYSTEMS AND METHODS FOR PROVIDING AN INTEGRATED PLATFORM FOR SECURE PRODUCT LABELLING, VERIFICATION, AND ENFORCEMENT

(71) Applicant: MYORI SERVICES SDN. BHD., Wilayah Persekutuan (MY)

(72) Inventors: Ken Ji Ling, Petaling Jaya (MY); Zul Imran Bin Abdul Rahaman, Puchong (MY); Ahmad Fuad Bin Mokhtar, Puchong (MY)

(73) Assignee: MYORI SERVICES SDN. BHD. (MY)

( * ) Notice: Subject to any disclaimer, the term of this patent is extended or adjusted under 35 U.S.C. 154(b) by 0 days.

(21) Appl. No.: 19/306,329

(22) Filed: Aug. 21, 2025

(65) Prior Publication Data

US 2025/0390689 A1 Dec. 25, 2025

Related U.S. Application Data

(63) Continuation-in-part of application No. 17/981,490, filed on Nov. 7, 2022, now abandoned.

(30) Foreign Application Priority Data

Nov. 8, 2021 (MY) ............................ PI2021006668

(51) Int. Cl.
*G06K 7/10* (2006.01)
*G06K 7/14* (2006.01)

(52) U.S. Cl.
CPC ....... *G06K 7/10297* (2013.01); *G06K 7/1417* (2013.01)

(58) Field of Classification Search
CPC ......................... G06K 7/10297; G06K 7/1417
See application file for complete search history.

(56) References Cited

U.S. PATENT DOCUMENTS 8,714,442 B2 * 5/2014 Sharma ................ G06Q 10/087 700/226

FOREIGN PATENT DOCUMENTS

WO WO-2017116303 A1 * 7/2017 ............. G06Q 10/00

* cited by examiner

*Primary Examiner* — Matthew Mikels
(74) *Attorney, Agent, or Firm* — Christopher Pilling

(57) ABSTRACT

A method for providing an integrated platform for secure product labelling, verification, and enforcement includes the steps of providing multiple first labels and multiple second labels aimed at labelling multiple products to be labelled, verified and protected; providing an online platform to be used by one or more enforcement agencies for monitoring activities of each product of the multiple products in the market, receiving complaints or reports directly from consumers and getting data analysis reports pertaining to the multiple products, and, supporting multi-agency collaboration activities. In use, the information sharing between agencies will become easier, thereby increasing their work efficiency.

14 Claims, 8 Drawing Sheets

The MyORI SmartSecure Platform

CONSUMERS
Mobile App

Revolutionising Product Labelling

- MyORI SmartSecure can upgrade existing Regulatory Labels with secure, encrypted labels
- Existing iconic label designs can be maintained
- Focus with KPDNHEP - Introducing and implementing secure labelling for product verification and originality across all industries

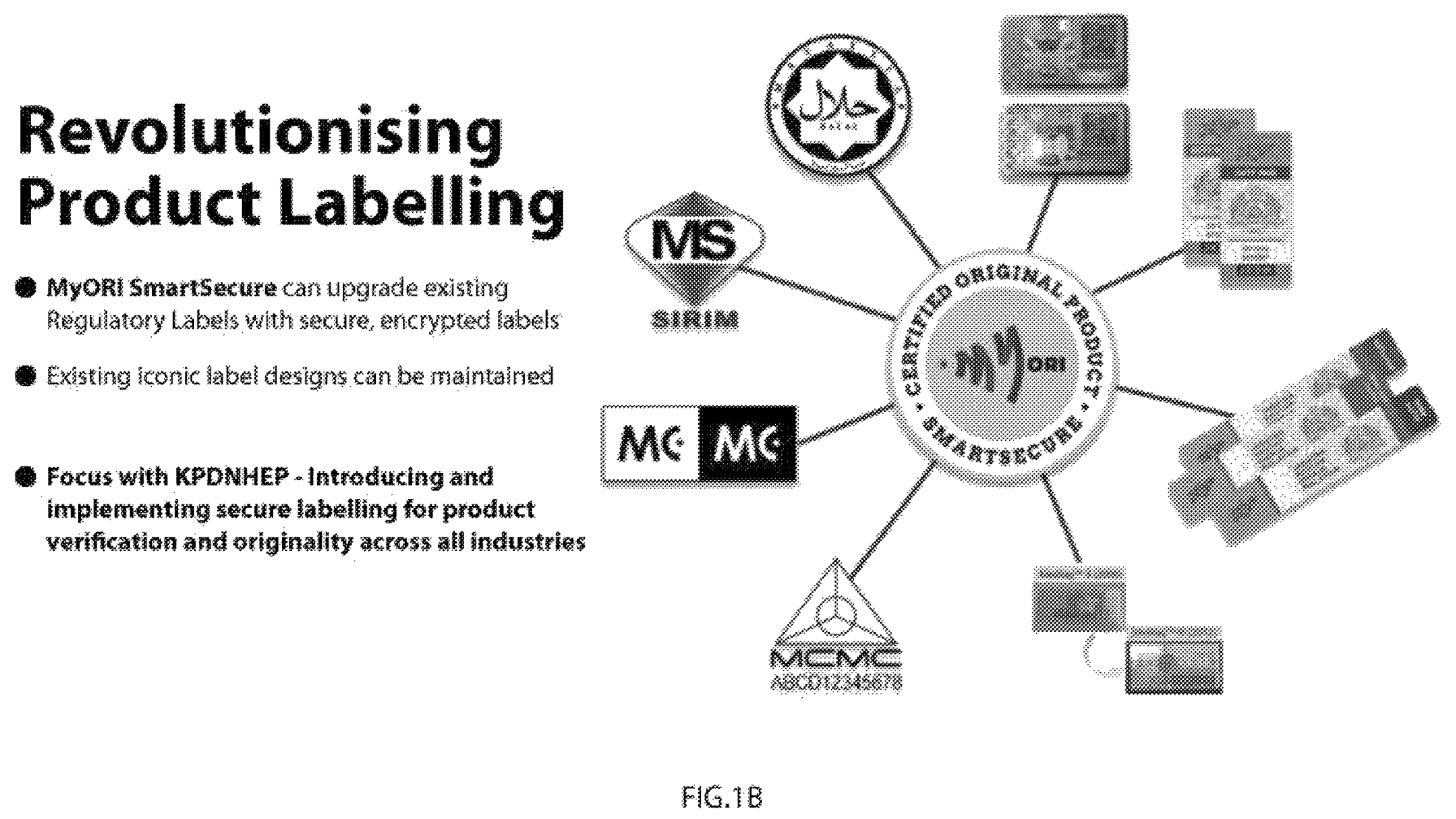

Revolutionising Product Labelling

- MyORI SmartSecure can upgrade existing Regulatory Labels with secure, encrypted labels
- Existing iconic label designs can be maintained
- Focus with KPDNHEP - Introducing and implementing secure labelling for product verification and originality across all industries

FIG.1B

FIG.1C
CERTIFIED ORIGINAL PRODUCT

MyORI SmartSecure Label

DATA CHIP

- NFC ISO 14443
- Encrypted Key Reference
- Write-once Data Checker
- Controlled Serial Number

The MyORI SmartSecure Platform

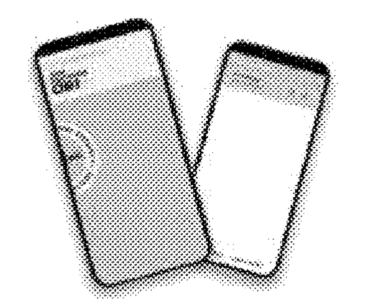

CONSUMER MOBILE

- Android and iOS
- Secure product verification
- Display product info
- Display manufacturer info
- Display Certification info
- Serial number checking
- Product alert and notifications
- Reported issue statistics

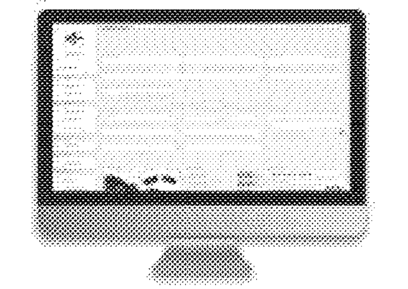
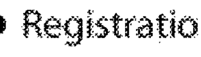

MANUFACTURER WEB

- Registration
- Update product info
- Label application
- Reference to product standards and regulatory
- Monitor reported issue
- Update product status and push product alert

ENFORCEMENT WEB & MOBILE

- Android and iOS
- Fully customizable for targeted enforcement group & also multi-agency collaborations
- Dashboard and Statistics

FIG.1D

The MyORI SmartSecure Consumer App (Scan)

REPLACEMENT SHEET

SYSTEMS AND METHODS FOR PROVIDING AN INTEGRATED PLATFORM FOR SECURE PRODUCT LABELLING, VERIFICATION, AND ENFORCEMENT

CROSS-REFERENCE TO RELATED APPLICATIONS

This application claims priority to Malaysian Application No. P12021006668 filed on Nov. 8, 2021, and to U.S. patent application Ser. No. 17/981,490 filed on Nov. 7, 2022, the entire contents of which are herein incorporated by reference in their entirety.

BACKGROUND OF THE INVENTION

1. Technical Field

Embodiments of the present invention generally relate to the field of data processing, and, more particularly, to systems and methods for providing an integrated platform for secure product labelling, verification, and enforcement.

2. Background

Generally, as it is known that fake replicas of real products known as counterfeits are being produced with the intention to avail the superior value of the imitated product. Furthermore, in other words, counterfeits are commonly called 'Knock offs' or 'fake goods' and are emulated or fake replicas of the real products.

Furthermore, counterfeit products that are sold online, cost a lot to the enterprises selling real products, which further damages these enterprises at multiple levels. Moreover, these counterfeit products not only affect revenue or sales but also impact the customer relationship and branding. Also, these counterfeit products sold online can cause health and safety issues, thus affecting the real brands negatively. To tackle counterfeit issues, many conventional techniques have been used that heavily depend on manual intervention due to lack of automated solutions capable of searching, classifying and taking actions against counterfeit products online.

In accordance with the conventional disclosures, the labelling of products with hologram stickers or QR Codes and sometimes even both has been disclosed. However, it is difficult to differentiate between a genuine and a fake hologram label because it depends entirely on visual appearance and consumers can be easily duped into buying fake products.

Additionally, in accordance with prior art disclosures, the use of radio-frequency identification (RFID) transponder or other embedded trigger technology within a sewn-in label that are incorporated into or attached to articles to be tracked has been disclosed. These RFID tags are manufactured with a unique identification number that cannot be altered by the user and is used only once. Further, the RFID tag is read-only and it responds to an interrogation signal only with its identification number. However, these tags may be removed with rough handling.

Furthermore, in accordance with the conventional disclosures, various anti-counterfeiting techniques have been disclosed that involve laser anti-counterfeiting, electronic code anti-counterfeiting, QR code anti-counterfeiting, RFID anti-counterfeiting, NFC anti-counterfeiting, and blockchain traceability. However, these are weak anti-counterfeiting capabilities by themselves.

Additionally, in accordance with the conventional disclosures, many anti-counterfeiting labels or marks have been used to distinguish brand-name products from the counterfeit products. There are many types of anti-counterfeit labels, including holographic anti-counterfeit labels, graphic-output laser anti-counterfeit labels, shape memory anti-counterfeit labels, hand tags, care labels and the like. However, these tags or labels are typically sticker attached to the exterior of the product, and may become detached with rough handling, or deliberately removed. Further, typical care labels are required to contain a large amount of information and it is difficult to fit all of the information on a care label or hang tag.

Furthermore, there are prior art disclosures wherein NFC (Near Field Communication) chips are incorporated onto the labels, making them unique anti-counterfeiting labels, but these labels cannot be transferred to other similar products. These existing labels are not always attachable to the diverse range of materials and surfaces found on various products.

Moreover, there are various disclosures wherein quality anti-counterfeiting methods including anti-counterfeit labels are used with two dimensional codes and combined with quality management systems. This method includes scanning two dimensional codes via mobile phones by the consumers to obtain relevant product quality inspection reports and to identify the authenticity of the product via phone or web page security code query. However, some merchants can fake the website content and use a similar type of anti-counterfeiting label with the intention of imitating the real ones, which cannot further be distinguished by the consumer or quality supervision.

Additionally, in accordance with the prior art disclosure that discloses a double ID anti-counterfeiting method and system, wherein two kinds of anti-counterfeiting codes are used, the first code is a retailer's code and the second code is a product code. Further, both of these codes must be provided to an authenticated server to authenticate the tag. However, the disadvantage of using this anti-counterfeiting method is that the retailer has already been determined before shipping the product, thus limiting the freedom of choice of retailer.

Therefore, there is a need for an integrated platform that provides product labelling, verification, authentication and enforcement. An improved method designed to solve the above challenges of counterfeit products for all stakeholders, consumers, retailers, manufacturers and regulators is needed. Overall, a system that can easily track product shipments and inventory, that provides quick and accurate assessments about the distribution of the product, that provides consumers with up-to-date information on authenticity, manufacturing standards, compliance status, and product recall information and provides useful reports and analysis to the authorities is needed. Accordingly, there remains a need in the art for innovative, novel, cost-effective and efficient solutions providing systems and methods for providing an integrated platform for secure product labeling, verification, and enforcement.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an object of the invention to provide systems and methods for providing an integrated platform for secure product labelling, verification, and enforcement.

In one embodiment, a method for providing an integrated platform for secure product labelling, verification, and enforcement, includes the steps of, providing multiple first labels and multiple second labels aimed at labelling a multiple products to be labelled, verified and protected; providing an online platform to be used by one or more enforcement agencies for monitoring activities of each product of the multiple products in the market, receiving complaints or reports directly from consumers and get data analysis reports pertaining to the multiple products, and, supporting multi-agency collaboration activities. In use, the information sharing between agencies will become easier, thereby increasing their work efficiency.

The embodiments of the present disclosure have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description", one will understand how the features of the present embodiments provide advantages, which include systems and methods for providing an integrated platform for secure product labelling, verification, and enforcement.

BRIEF DESCRIPTION OF THE SEVERAL VIEWS OF THE DRAWINGS

Various embodiments of the present invention are disclosed herein below, which relate to systems and methods for providing. an integrated platform for secure product labelling, verification, and enforcement.

Figure 1A:
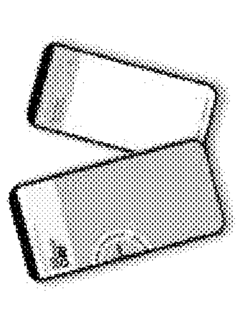
FIG. 1A, FIG. 1B, FIG. 1C, FIG. 1D, FIG. 1E, FIG. 1F, FIG. 1G, and, FIG. 1H, illustrate various aspects of the system and method for providing an integrated platform for secure product labelling, as per one embodiment of the instant invention. In accordance with an embodiment of the present invention, a method for providing an integrated platform for secure product labelling, verification, and enforcement, includes the steps of, providing multiple first labels and multiple second labels aimed at labelling multiple products to be labelled, verified and protected; providing an online platform to be used by one or more enforcement agencies for monitoring activities of each product of the multiple products in the market, receiving complaints or reports directly from consumers and receiving data analysis reports pertaining to the multiple products, and, supporting multi-agency collaboration activities. In use, the information sharing between agencies will become easier, thereby increasing their work efficiency.
Figure 1A:
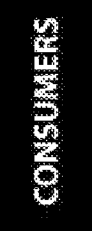
Figure 1A:
Figure 1A:
Figure 1A:
Figure 1A:
Figure 1A:
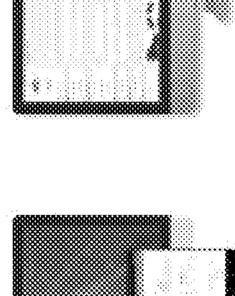
Figure 1A:
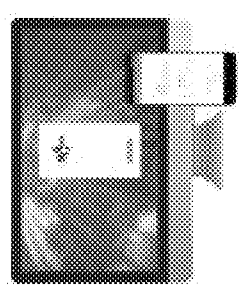
Figure 1A:
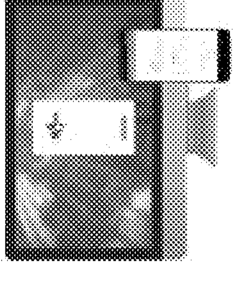
Figure 1A:
Figure 1A:
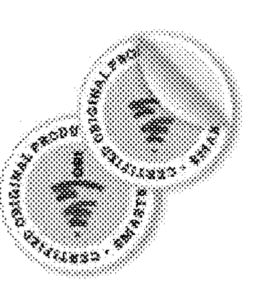
Figure 1A:
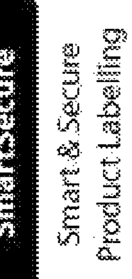

In accordance with an embodiment of the present invention, the method includes the step of providing an application resource installed on a user device associated with a user. In use, the application resource includes: a label scanner module for identifying authentic and/or counterfeit labels from the multiple first labels and/or the multiple second labels, a reporting module for recording findings of the application resource during raids and/or spot checks, and, a retailer module to allow multiple retailers to receive and scan the multiple products.

In accordance with an embodiment of the present invention, the first labels include NFC labels and the second labels include QR codes. In use, NFC labels enable the MyORI SmartSecure Platform to easily track product shipments and inventory, enabling quick and accurate assessments to be made about the distribution of the product. In further use, the MyORI SmartSecure Platform can track QR Code usage which can capture where and when the QR Code was scanned. Using this method will solve the issue of counterfeiters reproducing the QR Codes. Also, by implementing the MyORI SmartSecure Platform, the QR Code can once again be used as a smart and secure product labelling option.

In accordance with an embodiment of the present invention, the encrypted MyORI SmartSecure Labels can consolidate the labelling of goods and provide consumers with up-to-date information on authenticity, manufacturing standards & compliance status, as well as recall information and the ability to easily provide authorities with useful reports if anything is amiss.

In accordance with an embodiment of the present invention, the method further includes the step of upgrading existing Regulatory Labels with secure, encrypted labels via the multiple first labels and or the multiple second labels. Operationally, the methods and systems as disclosed herein are aimed at preventing counterfeits, duty-unpaid and non-conforming products from being sold as legitimate or approved products.

In accordance with an embodiment of the present invention, the methods and systems of the present invention are built and/or implemented using Near Field Communication (NFC) technology. In use, the systems and methods as disclosed herein are configured to be used only on products that comply with the manufacturing standards and regulatory body requirements.

In accordance with an embodiment of the present invention, a system for providing an integrated platform for secure product labelling, verification, and enforcement, includes, a plurality of first labels and a plurality of second labels aimed at labelling a plurality of products to be labelled, verified and protected; an online platform to be used by at least one enforcement agency for monitoring activities of each product of said plurality of products in the market, receiving complaints or reports directly from consumers and receiving data analysis reports pertaining to said plurality of products, and, supporting a plurality of multi-agency collaboration activities; an application resource installed on a user device associated with a user, said application resource including a label scanner module for identifying authentic and/or counterfeit labels from said plurality of first labels and/or said plurality of second labels, a reporting module for recording findings of said application resource during raids and/or spot checks, and, a retailer module to allow a plurality of retailers to receive and scan said plurality of products.

DETAILED DESCRIPTION OF EMBODIMENTS OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide systems and methods for providing an integrated platform for secure product labelling, verification, and enforcement.

As used herein, the singular forms "a," "an," and "the" include plural references unless the context clearly dictates otherwise. Any reference to "or" herein is intended to encompass "and/or" unless otherwise stated.

Those of ordinary skills in the art will appreciate that NFC and QR Codes are not newfound technologies while any experienced IT company are able to create a software or system, but the systems and methods of the present invention are aimed at providing the MyORI SmartSecure Platform as a solution to have successfully combined the two elements to create a complete brand protection ecosystem.

In one embodiment, high-security NFC chips are used. These chips may include secured NFC tags or even embedded secure elements in the case of being applied to an electronic product. In another embodiment, the NFC chips use physically-unclonable functions (PUFs) to prevent them from being cloned. In one embodiment, this includes using a PUF-derived key that never leaves the chip itself. In one embodiment, the NFC chips have added identification data and encryption data stored in read-only or locked data segments that cannot be tampered with after the chip is programmed. In one embodiment, the NFC chip manufacturer-set TAG ID is used as a derived key in a cryptographic key or as part of one.

In one embodiment, the visible QR Code applied to the product at sale transaction includes a hidden, encrypted code on a hidden layer of the label that is revealed by damaging the label itself by, for example, peeling off or scratching off part of the label to reveal the hidden code. In another embodiment, the MyORI SmartSecure Consumer App prompts the user to expose the hidden code and enter it when using the QR Code to verify the product. In this embodiment, physical tampering evidence is required to verify the product.

In one embodiment, the QR Code is printed with strong error-correcting codes which may include Reed-Solomon codes to improve scanning of the label under low lighting or to improve scanning of labels that become damaged, dirty or otherwise obscured. In one embodiment, the QR Code represents a dynamic secured reference derived from a specific NFC chip. In one embodiment, the QR Code is displayed in the MyORI SmartSecure Consumer App. In one embodiment, the QR Code is printed on the NFC label and a user can scan the QR Code on the product with a QR Code scanner or camera.

In one embodiment, the NFC or QR Code incorporates non-generic physical features alongside the code to enhance security. These physical features may include PUFs, microstructures, holograms, heat or light-sensitive elements or any other element that require the MyORI SmartSecure Consumer App to detect and verify. In one embodiment, the MyORI SmartSecure Consumer App prompts the consumer or provides guides on how to use their user device to scan and verify the authenticity of the product, including by capturing non-generic physical features with the device.

In use, under the MyORI SmartSecure Platform, each stakeholder; consumers, retailers, manufacturers (brand owner) and regulators (enforcement agencies) are actively working together to identify counterfeit products & prevent suspicious activities in the market.

Figure 1C:
Figure 1E:
Figure 1E:
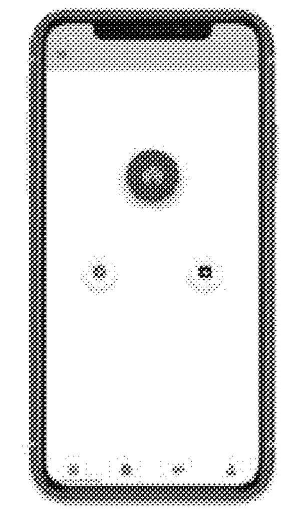
Figure 1E:
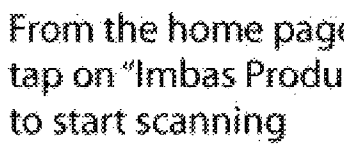
Figure 1E:
Figure 1E:
Figure 1E:
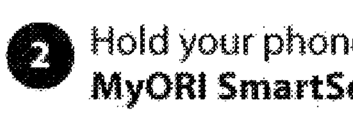
Figure 1E:
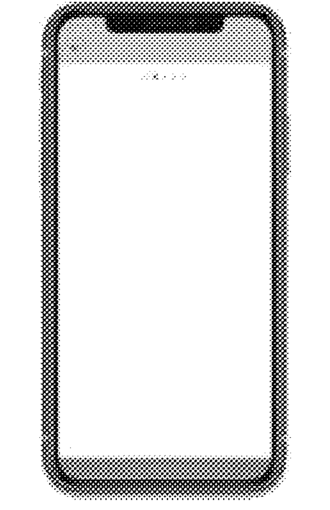
Figure 1E:
Figure 1E:
Figure 1E:
Figure 1F:
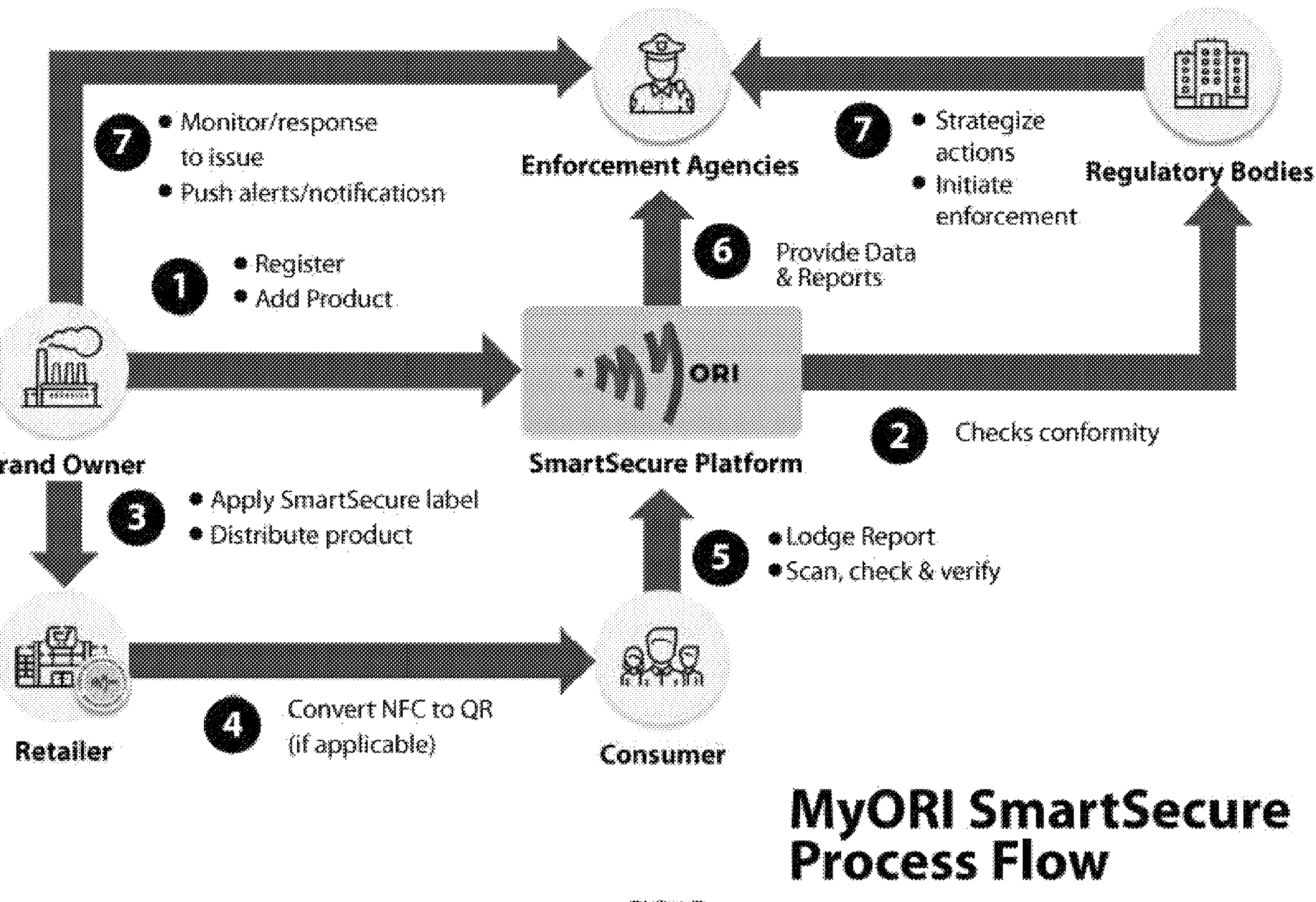

As illustrated in FIG. 1F, the MyORI SmartSecure Process Flow firstly provides an interface to a Brand Owner to register their business to be part of the platform. After a successful registration process, the Brand Owner must provide detailed information on the products that they wish to protect. Any information related to product certifications will be checked with the respective Regulatory Bodies to ensure proper compliance. After a successful product registration, Brand Owners will receive the MyORI SmartSecure Labels to be applied on their products before the distribution process.

The NFC, as a high-security tag, is used as a physical digital token that can be scanned using MyORI SmartSecure Consumer App to authenticate and verify identity or document ownership. In one embodiment, each NFC tag contains a unique, cryptographically protected identifier that, when scanned, is validated through a secure gateway and linked to a blockchain system. This adds an extra traceability feature not just in the blockchain system, but also extending full traceability on any NFC scanned, while also enabling tamper-proof, trusted access to digital services, records, or assets.

Subsequently, retailers will then receive the products for sale. With the use of the MyORI SmartSecure Converter, retailers can then generate a QR Code for each sale transaction. This process is only applicable to certain products.

In one embodiment, when consumers use the MyORI SmartSecure Consumer App to verify a product, the app actively decodes or decrypts the payload and validates it. If successfully validated, then the app will retrieve product data from a backend server and display it on the app. In one embodiment, the app extracts the NFC or QR Code data, runs it through a cryptographic check, such as a digital signature or challenge-response check, and decodes the protected payload. In one embodiment, instead of using a challenge-response check with a fixed code, the app uses a server-generated token or a time-varying token to grant authorization for the app to send a request for validation to the backend server. In one embodiment, after scanning the NFC or QR Code with the app, the app sends the public key of the NFC/QR Code to the server and the server generates a nonce and sends it to the app which transmits the nonce to the NFC/QR Code which signs it with its private key and returns a signature to the app. In this embodiment, even if the NFC or QR Code is cloned, the verification fails without the dynamic signature produced by the NFC/QR Code from the server-generated nonce.

In another embodiment, the app sends additional information such as device identifiers and GPS location to the integrated platform with each scan of a code. The backend platform logs the additional info sent from the app. In another embodiment, the platform compares the device identifiers and GPS location from a scan with expected values in order to complete a product verification. In one embodiment, the GPS location is used to validate products that have been configured and marked for region-specific control. This feature enables customers to monitor for gray market activity. In one embodiment, the MyORI SmartSecure Consumer App will alert the customer if gray market activity is detected based on the GPS location of the customer device when scanning the code on the product.

Also, by using the MyORI SmartSecure Consumer App, consumers can receive detailed product info and can lodge a report directly from the app if they notice any suspicious activity. In use, each complaint & reports made by the consumer will then be collected and sent directly to the respective Enforcement Agencies. Enforcement Agencies can receive & view all this data through the MyORI SmartSecure Enforcement Agency App. In one embodiment, enforcement agencies access the platform through a secure portal over SSL or TLS using two-factor authentication. In another embodiment, data is passed to and between agencies using API calls with OAuth tokens or JSON Web Tokens and encrypted channels. The case management system included in the app will allow them to easily manage each report. they receive and assign them to their enforcement officers. Through the application resource, Brand Owners that are involved can easily be contacted & notified by the Enforcement Agencies for enquiries or investigation purposes. They can also monitor each product under the MyORI SmartSecure program through the app.

In addition, the MyORI SmartSecure labels can upgrade existing Regulatory Labels with secure, encrypted labels in order to prevent counterfeits, duty-unpaid and non-conforming products from being sold as legitimate or approved products. Existing iconic label designs (KPDNHEP TULEN hologram, SIRIM MS, MCMC label, HALAL JAKIM, JKDM Duty-Paid) can be maintained to ensure consumer familiarity and trust is not lost, while other labels can be consolidated if deemed appropriate, as illustrated in FIG. 1C.

In one embodiment, the platform includes Business Intelligent tools to process and visualize relevant data for dashboard information and for a decision-support system for a user. The dashboard information may include location maps, scanning activities, product registrations, tags mapping and tracking. The ORI SmartSecure platform uses a secured and centralized RDMS database system to store, process and manage data. In another embodiment, an analytics engine on the backend applies pattern analysis or machine learning to the collected scanned data from the NFC and QR Codes and does anomaly detection to flag suspicious scanning behavior such as a surge of scans of the same product or widely divergent geolocations of scans of the same product. In another embodiment, the platform implements a graph database to link products, scans, users and agencies to enable rapid identification of fraud rings. In one embodiment, the graph database uses an indexed ledger to store the collected scanned data.

Figure 1G:
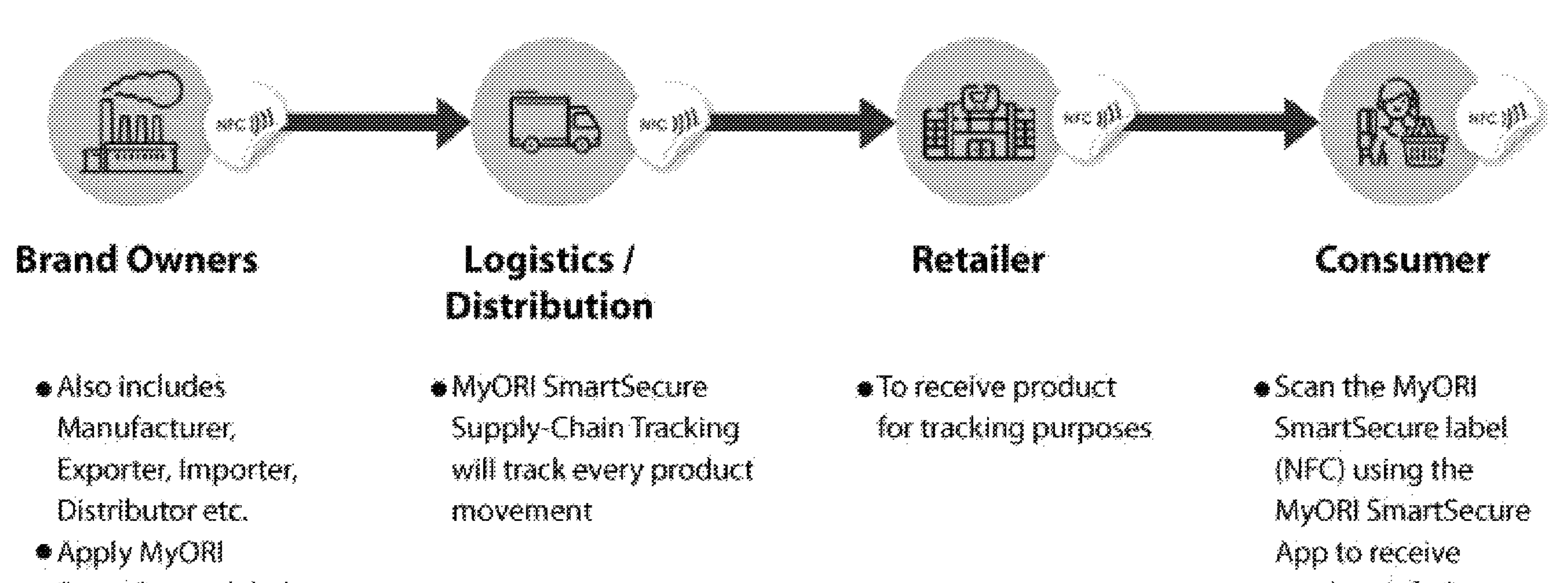
Figure 1H:
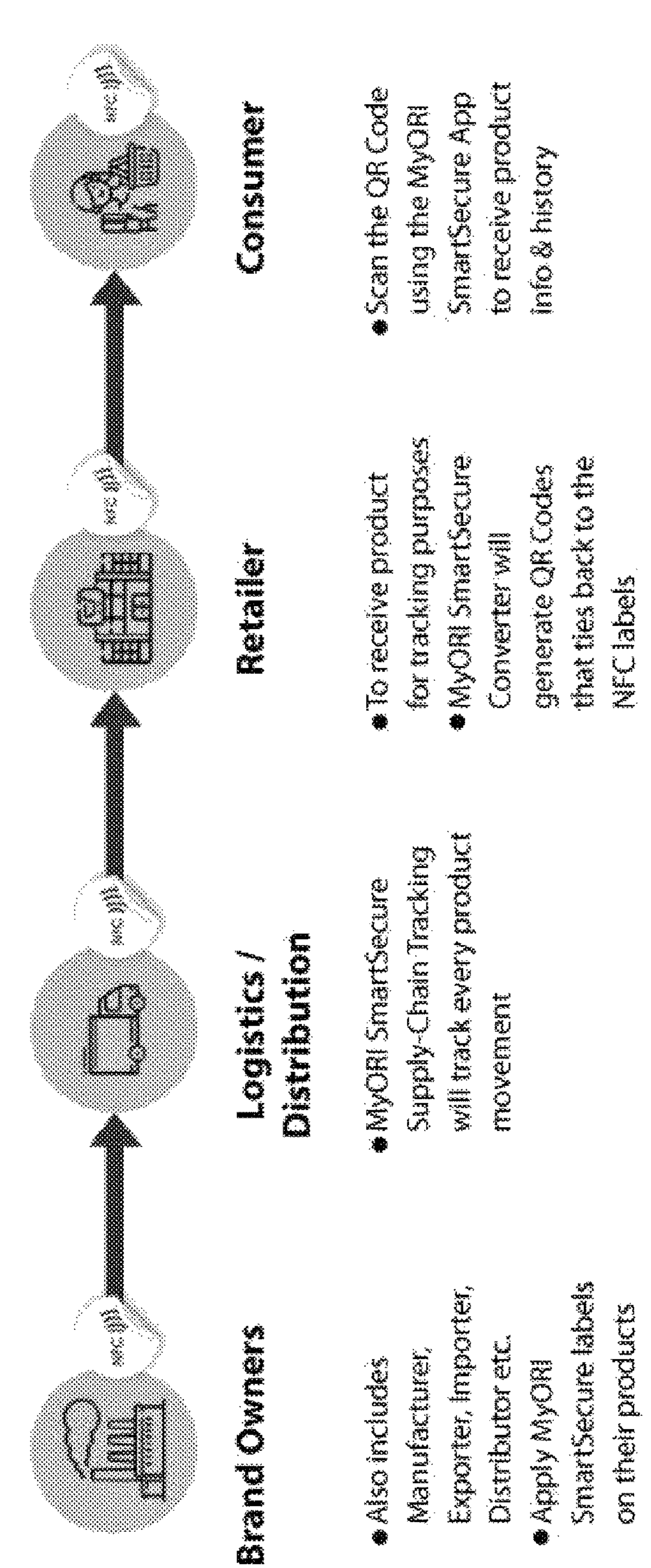

In accordance with an embodiment of the present invention, by having both NFC & QR Codes, MyORI SmartSecure offers 2 types of labelling process flow to cater to the various kinds of products in the market, as illustrated in FIG. 1G for End-to-end NFC labels, and as further illustrated in FIG. 1H for NFC to QR Codes.

Those of ordinary skill in the art will appreciate that systems and methods of the present invention provide significant advantages over the prior art, including, but not limited to, encrypted SmartSecure Labels that can consolidate the labelling of goods, providing consumers with up-to-date information on authenticity, manufacturing standards, compliance status, product recall information, and providing authorities with useful reports and analysis, and the like.

Those of ordinary skill in the art will appreciate that the systems and methods as disclosed herein by way of exemplary embodiments are embodied via an exemplary system for providing an integrated platform for secure product labelling, verification, and enforcement. In use, said system includes multiple user devices, each of which hosts a number of applications including a user application resource. In further use, each user application resource is communicatively coupled to other instances of the user application resources and a server system via said communication network (e.g. the Internet).

As used herein, the term "user device" may refer to any machine that interfaces to said communications network to obtain resources from one or more server systems or other user devices. In use, a user device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In accordance with an embodiment of the present invention, the communication network may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fit network, another type of network, or a combination of two or more such networks.

In accordance with an embodiment of the present invention, the communication network or a portion of the communication network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WIMAX), Long Term Evolution (LTE) standard, others defined by various standard setting organizations, other long range protocols, or other data transfer technology.

In accordance with an embodiment of the present invention, the systems and methods as disclosed herein are aimed at providing server-side functionality via the communication network to a user application resource aimed at providing systems and methods for providing an integrated platform for secure product labelling, verification, and enforcement.

In accordance with an embodiment of the present invention, the server system supports various services and operations that are provided to the user application resource. Such operations include transmitting data to, receiving data from, and processing data generated by the user application resource. This data may include, message content, user device information, geolocation information, media annotation and overlays, message content persistence conditions, social network information, and live event information, as examples. Those of ordinary skill in the art will further appreciate that data exchanges within the system are invoked and controlled through functions available via user interfaces (UIs) of the user application resource, as disclosed herein.

Those of ordinary skills in the art will appreciate that the systems and methods in accordance to the present invention may be embodied as a mobile application or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor, or in programmable or dedicated hardware, such as an ASIC or FPGA. As would be understood in the art, the computer, the processor or the programmable hardware include memory components, e.g., RAM, ROM, Flash, etc.

that may store or receive software or computer code that when accessed and executed by the computer, processor or hardware implement the processing methods described herein. Therefore, as may be seen, various embodiments of the present invention as disclosed hereinabove provide significant advantages over the prior art, such as, for example, but not limited to, the aspects disclosed hereinabove.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be per formed any particular embodiment. The terms "comprising," "including," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith. Therefore, the appended claims are to be construed to cover all equivalents falling within the true scope and spirit of the invention.

What is claimed is:

1. A method for providing an integrated platform for secure product labelling, verification, and enforcement, said method comprising the steps of:

registering, via the integrated platform, a brand owner;

providing a designated product produced by the brand owner for registration, wherein the brand owner seeks protection for the designated product, the brand owner providing product certifications for the designated product during registration;

checking, via regulatory bodies, to ensure the designated product has proper compliance;

registering, via the integrated platform, the product;

providing to the brand owner, via the integrated platform, a first label having an embedded NFC anti-counterfeiting feature using one or more physically-unclonable functions (PUFs) to prevent it from being cloned and a second label having a QR code;

securing the first label and the second label onto the designated product prior to distribution of the designated product;

distributing the designated product to one or more retailers for sale;

providing an online platform, via the integrated platform, to be used by at least one enforcement agency for monitoring activities of the designated product; and, for supporting a plurality of multi-agency collaboration activities;

providing an application resource installed on a user device associated with a user, the application resource including a label scanner module for identifying authentic and/or counterfeit labels from the first label and/or the second label, wherein the application resource includes a reporting module for recording findings of counterfeit labels, and, a retailer module to allow the one or more retailers to receive and scan the designated product;

sending product info to a user device corresponding to the first label applied to the product scanned by the label scanner module, and receiving a report from the user device;

generating the second label associated with the first label applied to the product scanned by the retailer module; and sending product info to a user device corresponding to the second label, which is generated by the scanning of the first label by the retailer module, when the second label is scanned by the label scanner module, and receiving a report from the user device.

2. The method as claimed in claim 1, wherein said method further includes capturing where and when the second label was scanned.

3. The method as claimed in claim 1, further comprising the step of upgrading an existing Regulatory Label with a secure, encrypted label via the first label and/or the second label.

4. The method as claimed in claim 1, wherein said method is configured to be used only on designated products that comply with the manufacturing standards and regulatory body requirements.

5. The method as claimed in claim 1, wherein the QR Code includes a hidden, encrypted code on a hidden layer of the label that is revealed by peeling off or scratching off part of the label to reveal the hidden code.

6. The method as claimed in claim 1, wherein the at least one enforcement agency accesses the platform through a secure portal over SSL or TLS using two-factor authentication.

7. The method as claimed in claim 1, wherein data is passed to and between enforcement agencies using API calls with OAuth tokens or JSON Web Tokens and encrypted channels.

8. A system for secure product labelling, verification, and enforcement, said system comprising:

a designated product produced by a brand owner;

an integrated platform enabling the brand owner having a business to:

register the business to be part of the integrated platform;

provide detailed information related to the designed product, wherein the detailed information includes product certifications;

register the designated product on the integrated platform;

receive, via the integrated platform a first label having an embedded NFC anti-counterfeiting feature using one or more physically-unclonable functions (PUFs) to prevent it from being cloned and a second label having a QR code; and affix the first label and the second label to the designated product prior to distribution to a retail marketplace;

the integrated platform enabling an enforcement agency to:

monitor activities of the designated product in the retail marketplace;

receive complaints or reports directly from consumers and get data analysis reports pertaining to the designed product; and support a plurality of multi-agency collaboration activities;

the integrated platform including an application resource enabling a user to install the application resource on a user device associated with the user, the application resource including a label scanner module for identifying authentic and/or counterfeit labels from the first label and/or the second label, a reporting module for recording findings of counterfeit labels, and, a retailer module to allow a plurality of retailers to receive and scan the designated product;

wherein the integrated platform sends product info to a user device corresponding to the first label applied to the product scanned by the label scanner module, and receives a report from the user device;

wherein the retailer module scans the first label applied to the product and generates the second label associated with the first label;

and wherein the online platform sends product info to a user device corresponding to the second label, which is generated by the scanning of the first label by the retailer module, when the second label is scanned by the label scanner module, and receives a report from the user device.

9. The system as claimed in claim 8, wherein said online platform captures where and when said second label was scanned.

10. The system as claimed in claim 8, wherein said system is configured to upgrade an existing Regulatory Label with a secure, encrypted label via the first label and/or the second label.

11. The system as claimed in claim 8, wherein said system is configured to be used only on designated products that comply with the manufacturing standards and regulatory body requirements.

12. The system as claimed in claim 8, wherein the QR Code includes a hidden, encrypted code on a hidden layer of the label that is revealed by peeling off or scratching off part of the label to reveal the hidden code.

13. The system as claimed in claim 8, wherein the at least one enforcement agency accesses the platform through a secure portal over SSL or TLS using two-factor authentication.

14. The system as claimed in claim 8, wherein data is passed to and between enforcement agencies using API calls with OAuth tokens or JSON Web Tokens and encrypted channels.

* * * * *